Patented Oct. 11, 1927.

1,645,233

UNITED STATES PATENT OFFICE.

ALPHONS GAMS AND MAX GIRARD, OF BASEL, SWITZERLAND, ASSIGNORS TO SOCIETY OF CHEMICAL INDUSTRY IN BASLE, OF BASEL, SWITZERLAND.

PROCESS FOR THE MANUFACTURE OF CALCIUM SALTS OF INOSITOL-PHOSPHORIC ACID.

No Drawing.     Application filed April 9, 1923. Serial No. 630,913.

The present invention relates to the manufacture of calcium salts of inositol-phosphoric acid and comprises the process of making these calcium salts of inositol-phosphoric acid.

The simplest method hitherto known for preparing the soluble alkali earth metal acid salts of the organic phosphorus compound occurring in most vegetable food stuffs, the constitution of which has been ascertained to be that of a dodecabsic inositol-phosphoric acid of the formula $C_6H_{24}O_{27}P_6$, has consisted in dissolving the saturated alkali earth metal salts of the formula $C_6H_{12}O_{27}P_6Me_6$ (Me=alkali earth metal), which are insoluble in water, by addition of acid and precipitation by means of alcohol in the presence of a certain excess of acid without previous precipitation of bases, the added acid being so selected that it yields with the base of the used insoluble salt an alkali earth metal salt soluble in dilute alcohol By a saturated salt of inositol-phosphoric acid a compound is understood wherein all the twelve hydrogen atoms of the phosphoric acid groups are replaced by a metal or equivalent radical, as for instance Ca, Mg, Na, $NH_4$, and the like.

For making a soluble calcium salt, for example, a saturated insoluble calcium salt of the inositol-phosphoric acid of the formula $C_6H_{12}O_{27}P_6Ca_6$ is dissolved in a certain excess of hydrochloric acid or nitric acid and the solution thus obtained is mixed with alcohol so as to percipitate an acid calcium salt of inositol-phosphoric acid.

Thus for obtaining a soluble calcium salt of inositol-phosphoric acid it has always been necessary in this known method to start with a saturated calcium salt of the acid.

If it was desired to obtain an acid calcium salt of inositol-phosphoric acid from another salt of this acid, it was necessary to adopt the round-about method of isolating the acid and afterwards to saturate this partially by means of a calcium salt.

Equally cumbrous was the method which used the iron salt; for this salt has to be separated and converted into the saturated sodium salt, from which the insoluble calcium salt was then obtained by treatment with a soluble calcium salt, the latter being subsequently converted into the soluble acid calcium salt by the process already described.

The present invention is an application of our discovery, that compounds of inositol-phorphoric acid of the formula $C_6H_{12}O_{27}P_6X$ (wherein the 12 hydrogen atoms represented by X are substituted wholly or in part by magnesium) react smoothly, under acid conditions, with calcium compounds to form calcium salts of the inositol-phosphoric acid.

The rational combination of this new observation with the aforesaid method of separating the acid calcium salts of inositol-phosphoric acid with alcohol affords a very simple process for arriving at the acid calcium salt of inositol-phosphoric acid by starting with magnesium salts of inositol-phosphoric acid.

For example, a saturated insoluble magnesium salt of inositol-phosphoric acid of the formula $C_6H_{12}O_{27}P_6Mg_6$ may easily be converted into an acid calcium salt of this acid by first dissolving said magnesium salt in a proportion of acid somewhat higher than is necessary for the formation of the acid magnesium salt, the dissolving acid being one which forms a magnesium salt soluble in dilute alcohol, for instance hydrochloric acid, then adding to this solution a quantity of the soluble calcium salt such as calcium chloride equivalent to the acid magnesium salt, and finally precipitating the acid calcium salt of inositol-phosphoric acid from the solution by means of alcohol.

If it is desired to obtain a mixed acid calcium and acid magnesium salt of inositol-phosphoric acid the procedure is analogous, with the proviso that the acid magnesium salt is caused to react with a quantity of soluble calcium salt diminished in accordance with the desired molecular ratio of calcium to magnesium.

The conversion of a solid acid magnesium salt of inositol-phosphoric acid into the corresponding acid calcium salt may correspondingly be effected by dissolving the magnesium salt in water, mixing it with the calculated proportion of a soluble calcium salt and precipitating the acid calcium salt of inositol-phosphoric acid thus obtained by means of alcohol.

Instead of converting the saturated or the acid magnesium salt directly into the acid calcium salt, one may first convert it into the insoluble saturated calcium salt of inositol-phosphoric acid by addition of calcium hydroxide to the acid solution of the saturated magnesium salt, or to the aqueous solution of the acid magnesium salt, then dissolving the insoluble saturated calcium salt in somewhat more acid than is necessary for the formation of the acid calcium salt, and finally precipitating by means of alcohol.

The method hereinbefore indicated constitutes an essential technical advance, since it is known that a series of plants which yield by the known extraction processes inositol-phosphoric acid in the form of salts contain almost exclusively magnesium salts and only to a small extent calcium salts, whereas for therapeutical purposes the demand is for a salt consisting essentially of the calcium salt.

It will be obvious that the ambit of this invention is not limited to the reactions described above and particularly detailed in the examples. The invention covers all forms of the process which, starting from any magnesium salt, uses, on the one hand, the double decomposition to a calcium salt, and, on the other hand, the alcohol precipitation, producing directly or indirectly an acid calcium salt of inositol-phosphoric acid.

The following examples illustrate the invention:

Example 1.

10 kilos of a crude insoluble magnesium salt of inositol-phosphoric acid such as is present in certain plants, containing 17.86 per cent of phosphorus, 10.76 per cent of magnesium and 1.47 per cent of calcium, are dissolved in such a quantity of hydrochloric acid of 10 per cent strength that the solution is acid to congo (about 30 litres). The solution thus obtained, if necessary after filtration and decolorizing with animal charcoal, is mixed with 2½ kilos of a solid anhydrous calcium chloride and filtered. The clear filtrate is mixed with 1½ times its volume of alcohol; the precipitate thus produced is filtered, washed with alcohol until the filtrate is free from chlorine, and dried in a vacuum at 40–50° C.

There is thus obtained a snow-white powder, soluble to a clear solution in water; when dried it contains 20.92 per cent of phosphorus, 12.93 per cent of calcium and 1.52 per cent of magnesium.

It is clear that by diminishing the proportion of calcium chloride used, the product obtained may contain a larger proportion of magnesium to calcium than that stated above.

In order to obtain, for example, a mixed acid calcium-magnesium salt containing the bases in the molecular proportions of 1:1, the acid magnesium salt may be caused to react with half a molecular proportion of a soluble calcium salt, such as calcium chloride (the proportion being calculated on the acid magnesium salt).

Example 2.

10 kilos of crude insoluble magnesium salt (such as is described in Example 1) are suspended in water, and this suspension is mixed with dilute hydrochloric acid until acidity to congo is indicated. The solution thus obtained is filtered if necessary; the filtrate is made feebly alkaline to phenolphthalein by mixing it with milk of lime. The precipitate thus obtained is filter-pressed, washed with water, and then dissolved in water by addition of dilute hydrochloric acid until the liquid is acid to congo; the solution is filtered if necessary and decolorized with animal charcoal. The filtrate is mixed with about twice its volume of alcohol to produce the precipitate, which is then filtered, washed with alcohol, and dried in a vacuum at 40–50° C. The pure white acid calcium salt thus obtained contains when dry 21.48 per cent of phosphorus, 12.95 per cent of calcium and 1.21 per cent of magnesium.

Example 3.

2 kilos of acid magnesium salt of inositol-phosphoric acid (Mg=12.5 per cent) are dissolved in about 5 litres of water and the solution is acidified to congo by means of dilute hydrochloric acid. The solution is then mixed with 3600 cc. of calcium chloride solution of 30 per cent strength and then with 1½–2 times its volume of alcohol. The precipitate is washed with alcohol and dried in a vacuum.

The pure white water-soluble powder thus obtained contains when dry 21.86 per cent of phosphorus, 12.93 per cent of calcium and 0.44 per cent of magnesium.

Claims:

1. The herein described manufacture of calcium salts of inositol-phosphoric acid, consisting in causing compounds of inositol-phosphoric acid of the formula:

$$C_6H_{12}O_{27}P_6X$$

(wherein the 12 hydrogen atoms represented by X are substituted wholly or in part by magnesium) to react under acid conditions with calcium compounds soluble in the reaction medium and whose anion yields with magnesium a salt soluble in dilute alcohol.

2. The herein described manufacture of soluble acid calcium salts of inositol-phosphoric acid, consisting in causing solutions of the acid magnesium salts of inositol phosphoric acid to react, with a calcium compound which is soluble in the reaction medium and whose anion yields with magnesium a salt soluble in dilute alcohol and precipitating the solution of the acid calcium salt of inositol-phosphoric acid thus obtained with alcohol.

3. The herein described manufacture of soluble acid calcium salts of inositol-phosphoric acid, consisting in causing magnesium compounds of inositol-phosphoric acid to react, in form of their solutions obtained by dissolution of the salts with somewhat more acid than is necessary for forming the acid salts, with a calcium compound which is soluble in the reaction medium, and whose anion yields with magnesium a salt soluble in dilute alcohol, employing a quantity of the calcium compound equivalent to the acid salts of inositol-phosphoric acid present, and precipitating the solution of the acid calcium salt of inositol-phosphoric acid thus obtained with alcohol.

4. The herein described manufacture of soluble acid calcium salts of inositol-phosphoric acid, consisting in dissolving a saturated magnesium salt of inositol-phosphoric acid of the formula: $C_6H_{12}O_{27}P_6Mg_6$ by means of somewhat more of an acid yielding with magnesium a salt soluble in dilute alcohol, than is necessary for forming the acid magnesium salt of the inositol-phosphoric acid, adding to this solution a calcium salt which is soluble in the reaction medium, and whose anion yields with magnesium a salt soluble in dilute alcohol, employing a quantity of the calcium salt equivalent to the acid magnesium salt of the inositol-phosphoric acid present, and precipitating the solution of the acid calcium salt of the inositol-phosphoric acid thus obtained by means of alcohol.

In witness whereof we have hereunto signed our names this 28th day of March, 1923.

Dr. ALPHONS GAMS.
Dr. MAX GIRARD.